United States Patent [19]

Hundt et al.

[11] 4,418,575
[45] Dec. 6, 1983

[54] METHOD FOR PROCESSING ULTRASONIC ECHO SIGNALS OF BOTH DIRECTIONALLY REFLECTING AS WELL AS NONDIRECTIONALLY SCATTERING OBJECTS, PARTICULARLY FOR ULTRASONIC IMAGE PROCESSING IN THE FIELD OF SUBSTANCE OR TISSUE INVESTIGATION

[75] Inventors: Eckart Hundt, Haar; Elmar Trautenberg, Fuerth, both of Fed. Rep. of Germany

[73] Assignee: Siemens Aktiengesellschaft, Berlin & Munich, Fed. Rep. of Germany

[21] Appl. No.: 264,131

[22] Filed: May 15, 1981

[30] Foreign Application Priority Data

May 21, 1980 [DE] Fed. Rep. of Germany ....... 3019435

[51] Int. Cl.³ ............................................ G01N 29/00
[52] U.S. Cl. ...................................... 73/607; 128/660
[58] Field of Search ................. 73/602, 606, 607, 609, 73/620; 367/7, 11; 128/660

[56] References Cited

U.S. PATENT DOCUMENTS

| 4,021,771 | 5/1977 | Collins et al. | 367/11 |
| 4,106,346 | 8/1978 | Matzuk | 128/660 |
| 4,322,974 | 4/1982 | Abele et al. | 128/660 |

Primary Examiner—Stephen A. Kreitman
Attorney, Agent, or Firm—Hill, Van Santen, Steadman & Simpson

[57] ABSTRACT

In an exemplary embodiment partial images of an object are obtained by scanning the object from different directions, e.g. by compound scanning. For a given object region or point, the different partial images may include a response maximum signifying a directionally reflecting region. Other object regions may provide echo signal amplitudes in a range signifying a locally isotropic scattering. According to the disclosure, the partial images are linked or combined taking account of the nature of the respective object regions as being directionally reflecting or nondirectionally scattering.

31 Claims, 2 Drawing Figures

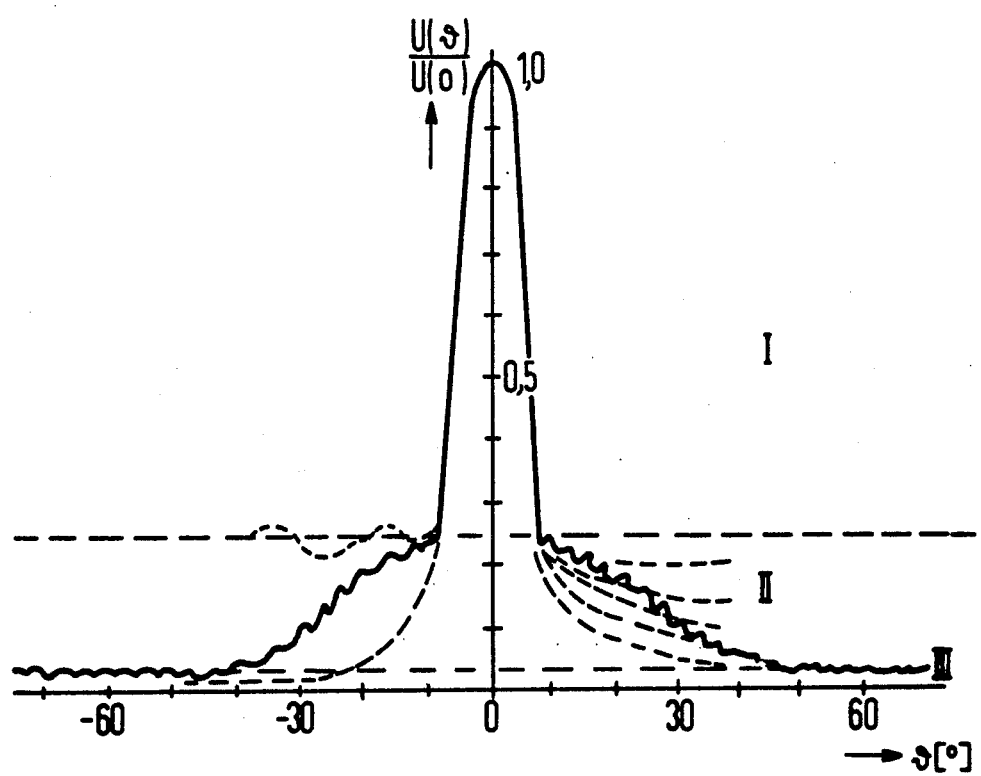

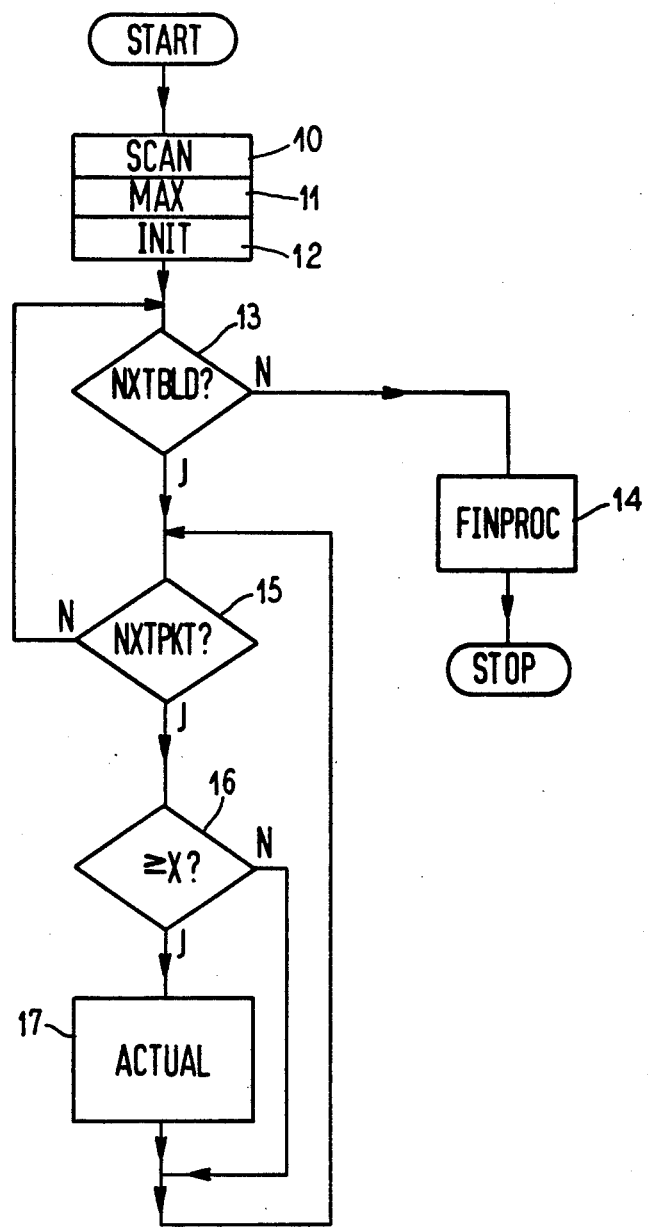

METHOD FOR PROCESSING ULTRASONIC ECHO SIGNALS OF BOTH DIRECTIONALLY REFLECTING AS WELL AS NONDIRECTIONALLY SCATTERING OBJECTS, PARTICULARLY FOR ULTRASONIC IMAGE PROCESSING IN THE FIELD OF SUBSTANCE OR TISSUE INVESTIGATION

BACKGROUND OF THE INVENTION

The present invention relates to a method for processing ultrasonic echo signals of both directionally reflecting and non-directionally scattering objects, particularly for ultrasonic image processing in the field of substance or tissue investigation in which ultrasonic echo signals proceeding from various scanning directions are combined.

Known methods for processing ultrasonic echo signals cannot process signals proceeding from exactly reflecting and isotropically scattering object ranges with equal quality. Areas with a highly directional reflection, such as, for example, organ contours or cranium bones of an embryo, are imaged well in the known "B-scan method" insofar as they are oriented in such manner that the reflected echoes strike the receiver. In contrast thereto, centers which scatter isotropically are only weakly reproduced and blurred in the "B-scan method" and can therefore be covered in the image by other image elements.

The B-scan image of ultrasonic imaging known from previously known employments has further deficiencies in addition to the above disadvantages. Thus, among other things, the resolution of such ultrasonic images at right angles to the irradiation direction is significantly poorer than in the irradiation direction. Moreover, signals from individual scattering centers are suppressed in comparison to the stronger reflection signals of surfaces.

These deficiencies are partially overcome in that B-scan images from a plurality of directions are superimposed according to the known compound-scan method. Therewith, reflecting surfaces can be generally imaged rather well. The resolution given punctiform scattering centers, however, is worsened. Due to the blurring of the point image at right angles to the direction of irradiation and due to the super-imposition, punctiform scattering centers are blurred in a star shape.

In the known method of "X-ray computer tomography", every point is expanded or spread into a strip. The strips gained in such manner are filtered and superimposed in accord with a method designated below as "spread image method".

In contrast thereto, this spread image method of X-ray computer tomography reproduces object parts with a locally isotropic scatter behavior very well. Significant image errors, however, occur given greatly anisotropic, i.e., exactly reflecting surfaces.

The attempt to transfer the spread image method to objects with precisely reflecting boundaries must fail. This becomes understandable when one considers that, given this method, strips with respectively equal echo transit times are superimposed from different irradiation directions. An isotropically scattering center contributes with equal strength to each strip proceeding through it and is therefore reproduced at its location in the superimposition. A point with a precisely reflecting environment, however, contributes to only one strip. This is orthogonal to the respective reflection direction. It contributes nothing to the other strips passing through said point. In the superimposition, therefore, it is practically suppressed. Standard convolution for filtering of the image gained from the superimposition of said strips has an additional negative influence on the result in the case of exact reflection. This convolution is only correct given "isotropic" superimposition. Missing image amounts give rise to disruptions.

Extensive investigations in the area of ultrasonic echo image generation concerning the reflection and scatter behavior in biological agents have shown that both isotropic scatter behavior and exact reflection and their mixed forms play a significant role.

SUMMARY OF THE INVENTION

The object of the present invention is to contribute a method for processing ultrasonic echo signals from both directionally reflecting and nondirectionally scattering objects which is particularly suitable for ultrasonic image processing in the area of substance and tissue investigation. According to the object of the invention, the images generated should be largely free of image blurrings and disruptive or falsifying image elements.

The present invention proceeds from the perception that the object as erected can be achieved by means of the combination of superimposed B-scan images or selected parts thereof and a so-called strip image corrected by means of a convolution integral. The invention further proceeds from the perception that the complicated and extensive calculations required for this can be executed with the means of available hardware and the available knowledge for the development of a suitable software for the computer technology.

The object underlying the present invention is achieved by means of a method for processing ultrasonic echo signals of both directionally reflecting and nondirectionally scattering objects, particularly for ultrasonic image processing in the field of substance or tissue examination, in which ultrasonic echo signals from various scanning directions are combined, said method being characterized in that a linkage (coupling or combining) of echo signals from different scanning directions ensues for the production of an image in such manner that the derivation of the echoes from directionally reflecting or nondirectionally scattering object areas is taken into consideration.

The inventive method renders possible an advantageous ultrasonic imaging by means of which reflecting surfaces and scattering centers can be simultaneously imaged with improved image quality. Thereby, surfaces are advantageously completely imaged. The resolution at right angles to the irradiation direction is improved. Moreover, the method offers the advantage that the image of scattering centers and the image of the reflecting surfaces can be processed separately and with differing corrections (for example, of physical noise effects or for the purpose of image improvement).

Further developments of the present invention are characterized by the features cited in the subclaims.

In the following, the present invention is described on the basis of several Figures on the accompanying drawing sheets; and other objects, features and advantages will be apparent from this detailed disclosure and from the appended claims.

BRIEF DESCRIPTION OF THE DRAWINGS

FIG. 1 schematically shows a plot of the reflection and scatter characteristics in various types of biological tissue given echo operation (transmitter=receiver); and FIG. 2 schematically shows a flow chart for the method steps to be inventively executed according to an exemplary embodiment of the invention.

DETAILED DESCRIPTION

As already explained, FIG. 1 schematically shows graphically the reflection and scatter characteristics in various biological tissue types given assumed echo operation with a common transducer serving as transmitter and receiver, whereby the ratio of the echo signal amplitude (as a function of the angle of incidence), $U(\theta)$, to the echo signal consisting of total reflection given perpendicular irradiation, $U(0)$, is plotted as a function of the angle of incidence ($\theta$). The ordinate is divided into three ranges by the horizontal dash lines, namely, a range I which is only generally reached by signals proceeding from exact reflection, a range II which is generally occupied by signals proceeding from diffuse reflection, and a range III which is generally exclusively occupied by signals proceeding from isotropic scattering. FIG. 1 shows curves obtained from measured results based on measurements of various biological tissue types, such as liver tissue or muscle tissue and ground tissue, for example, sausage. The curve areas with broken lines represent mean values or idealized values. As can be seen, the reflection behavior, even given precisely reflecting tissue, is also characterized by diffuse reflection or even by isotropic scattering as a function of the angle of incidence of the ultrasonic pulses. FIG. 1 clearly shows that exact reflection plays a determining role in addition to an isotropic scattering behavior.

As already explained, FIG. 2 schematically shows a flow chart for an exemplary embodiment of the invention for the method steps which are inventively required. According to this embodiment, ultrasonic echo signals are obtained from various scanning directions of the object to be examined in a first method step "SCAN" represented by block 10, FIG. 2. The totality of signals from one scanning direction is designated a partial image. Simultaneously or subsequently, the maximum of the signal intensity for each individual image point is sought from the partial images gained from various scanning directions, such maximum being sought in a second method step "MAX" represented by block 11, FIG. 2. Simultaneously or subsequently, the images to be produced are subject to initialization in a third method step "INIT" represented by block 12 of FIG. 2. All partial images are called up in sequence for further processing at a first branching "NXTBLD?" (decision block 13, FIG. 2). If a next partial image no longer exists, branch path "N" from block 13 is followed, and a post-editing operation "FINPROC" (block 14, FIG. 2) is called in. As long as a further partial image pends for processing, branch path "J" from decision block 13 is followed and every point of the current partial image is called in for processing via a further branch "NXTPKT?" (decision block 15) and, after the current partial image has been worked off, i.e., when a next point no longer remains, a jump is undertaken (via path "N" from block 15) back to the first branch "NXTBLD?" (decision block 13). For each point of a respective partial image being processed, the signal intensity of the partial image point is compared to its allocated maximum value proceeding from the maximum value MAX for the partial image (obtained at block 11), such comparison taking place in a last branch "$\geq X?$" (represented by decision block 16). If the value for a given point of the partial image is, for example fifty percent (50%) of a threshold value X derived from the maximum value, then this point has a value less than the value X (referring to block 16) and this point is ignored (according to path "N" from block 16). Alternatively thereto, such a point having a value less than the threshold value X can also be processed in a separately entrained image with identical points of other partial images to produce e.g. a precursory image representing diffuse reflecting image areas. In that case in which the partial image value equals or exceeds the threshold value X (path "J" from block 16), the appertaining point is linked (or combined) with one or more of the images to be generated e.g. a precursory image representing reflecting image areas, the partial image value for such point being linked in an additional method step "ACTUAL" (block 17). Subsequently, the next point of the current partial image is called in via the branch "NXTPKT?" (block 15). In the post-editing operation "FINPROC" (block 14), the linked image (produced at block 17) or, respectively, the linked images are standardized with the assistance of standardizing [or: scaling] weights which have been carried along during the linkage. Beyond that, block 14 can inventively execute further image processing steps which are discussed further below.

According to a further development of the invention, the threshold value (X, block 16) is not selected relative to the topical maximum (MAX, block 11) but, rather, uniformly with respect to a threshold value Y based on a maximum value for an image region including the image point under consideration or with respect to a threshold value Z based on a maximum value for an overall image. The linkage of echo signals is advantageously not only related to individual echo sequences ("A-scans"), but, rather, groups of echo signals respectively combined into partial images can be processed, said groups, consisting of one or mre single echo sequences.

According to a further development of the invention, the partial images are produced according to one of the B-scan methods known per se. Alternatively thereto, the partial images can be determined according to the sector-scan method known per se. Another alternative consists therein that the partial images are also advantageously produced according to the compound-scan method known per se. The production of the partial images inventively ensues according to a method with separate ultrasonic transmitters and receivers or with a common transducer acting as ultrasonic transmitter and receiver. However, the idea underlying the invention can be carried out in accord with any desired echo method.

The linkage of the echo signals expediently ensues by means of an additive superimposition. An inventive alternative thereto consists therein that the linkage is undertaken by means of multiplicative superimposition. According to a further development of the invention, the linkage can also be executed by means of indirect or direct mixed additive/multiplicative superimposition.

Expediently, the linkage is executed as a function of the respective image structure with differing weighting of individual image areas. It advantageously ensues as a function of the respective image structure with differing weighting of individual scanning directions. For the linkage of the echo sequences, it is advantageously not only the respective object point but, rather, its environment which is taken into consideration. Thereby, the shape and position of said environment as well as the weighting factor is determined according to the signal intensities of the environment. According to another further development of the invention, it is not only the respective object point, but, rather, its environment as well and the weighting factor according to the shape and relative position of the ultrasonic lobe which are determined for the linkage of the echo sequences.

An advantageous further development consists therein that the number of partial images which have contributed in the linkage to the respective image point is noted in a separate image. The topical weighting functions respectively taken into consideration in the linkage of the partial images are also linked in a separate image produced in such manner.

The images produced are employed in order to recognize the "isotropy character" of the echoes from the respective image regions, to interpret them and/or to further process them. A further development of the invention is characterized in that an image which largely represents the nondirectionally scattering object parts is filtered out of the linkage image of the partial images by means of the "isotropy image". A further image which largely represents the directionally reflecting object parts is filtered out of the linkage of the partial images by means of the "isotropy image". A further image which represents a continuously prescribable or permanently selectable ratio of nondirectionally scattering and directionally reflecting object regions can also be filtered out of the linkage image of the partial images by means of the "isotropy image".

The image parts filtered out are freely selected or automatically set as a function of the object to be represented.

A further advantageous further development of the invention provides that the signals proceeding from scattering object areas are already suppressed in the measuring exposure and/or production of the partial images in order to exclude disruptive or falsifying image elements. The signals proceeding from directionally reflecting object areas can likewise already be suppressed in the measuring exposure and/or in the production of the partial images in order to exclude disruptive or falsifying image elements.

A before-image or precursor image gained from echo signals of scattering object areas is produced according to a tomography (back projection) method known per se from x-ray examination methods. An advantageous further development of the invention provides that the back projection method known per se is employed in all cases in which a clear ratio of nondirectionally scattering object parts exists and/or is desired in the image. According to the present invention, the image respectively gained is corrected before or after the linkage by means of a filtered back projection known per se.

The image to which the known back projection method is applied in those cases in which a clear ratio of nondirectionally scattering object regions is present and/or is desired in the image and which has been corrected before or after the linkage by means of the known filtered back projection is respectively linked with an image produced according to the method steps described above in order to produce a corrected overall image.

In accord with the invention, all specified method steps are executed by means of digital computers, preferably microcomputers.

It will be apparent that many modifications and variations may be effected without departing from the scope of the novel concepts and teachings of the present invention.

Our copending application U.S. Ser. No. 264,130, filed May 15, 1981, and the related German Application P 30 19 436.6, filed May 21, 1980, are incorporated herein by reference.

In an exemplary embodiment according to said copending application, the processing techniques of computerized X-ray tomography (e.g. as described in Section 2.2 "Integral Transformation Techniques", in Siemens Forsch.—u. Entwickl.—Ber., Vol. 7, 1978, No. 4, pages 196–203, "Principles of Image Reconstruction in X-ray Computer Tomography") are applied to ultrasonic echo signals obtained by compound scanning at successive points so as to define successive fan-shaped scanning configurations. The result is a precursory image predominantly or exclusively representing nondirectionally scattering image points of the scanned layer. The ultrasonic echo signals are also processed to provide a second precursory image representing exclusively or predominantly directionally reflecting image points. The respective precursory images with respect to each image point or point region are then suitably combined to provide a stored ultrasonic image capable of providing a display of the scanned region with improved accuracy, resolution, and freedom from noise.

In an exemplary embodiment according to the present application partial images of an object are obtained by scanning the object from different directions, e.g. by compound scanning as in the copending application. For a given object region or point, the different partial images may include a response maximum signifying a directionally reflecting region. Other object regions may provide echo signal amplitudes in a range signifying a locally isotropic scattering. According to the present disclosure, the partial images are linked or combined taking account of the nature of the respective object regions as being directionally reflecting or nondirectionally scattering. For example, a precursory image which excludes image regions giving rise to isotropic scattering may be processed with a suitable correction for physical noise effects, e.g. echo signals of range III, FIG. 1, i.e. below a threshold value represented by the lower dash line in FIG. 1, may be eliminated by the processing step of block 16. Echo signals of the partial images based on nondirectionally scattering object regions may be differently processed for example utilizing a convolutional filtering and back projection technique (such as practiced for X-ray tomography as described in the above referenced article in Siemens Forsch.—u. Entwicke. Ber., Vol. 7, 1978, No. 4, pages 196–203). The differently processed image signals may be combined and the resultant image stored and then read out so as to provide an image display with higher resolution, greater accuracy and reduced noise.

We claim as our invention:

1. A method for processing ultrasonic echo signals of both directionally reflecting and nondirectionally scattering objects, particularly for ultrasonic image processing in the field of substance and tissue examination, said method comprising: scanning an object from various scanning directions to produce respective ultrasonic echo signals from respective common object areas, and linking the ultrasonic echo signals from various scanning directions as to respective common object areas in dependence upon the presence of echo signal amplitudes corresponding to directional reflection from the object for producing an image in such manner that the derivation of the echoes from directionally reflecting or nondirectionally scattering object areas is taken into consideration.

2. A method according to claim 1, characterized in that the scanning of the object takes place along an array of scanning lines to produce respective groups of echo sequences representing respective partial images, each group of echo sequences consisting of one or more single time sequences of echo signals based on a given scanning line.

3. A method according to claim 2, characterized in that the partial images are produced according to a B-scan method by scanning along an array of parallel scanning lines.

4. A method according to claim 2, characterized in that the partial images are produced according to a sector-scan method by scanning along a sector configuration of scanning lines.

5. A method according to claim 2, characterized in that the partial images are produced according to a compound-scan method by scanning along a sector configuration of scanning lines at each of a series of points.

6. A method according to claim 2, characterized in that the partial images are produced according to a method executed with separate ultrasonic transmitters and receivers.

7. A method according to claim 2, characterized in that the partial images are produced according to an ultrasonic echo method.

8. A method according to claim 1, characterized in that the linking step is carried out by means of additive superimposition.

9. A method according to claim 1, characterized in that the linking step is carried out by means of multiplicative superimposition.

10. A method according to claim 1, characterized in that the linking step is carried out by means of mixed additive/multiplicative superimposition.

11. A method according to claim 1, characterized in that the linking step is carried out as a function of the respective image structure with different weighting of individual image areas.

12. A method according to claim 1, characterized in that the linking step is carried out as a function of the respective image structure with different weighting of individual scanning directions.

13. A method according to claim 11 or 12, characterized in that it is not only the respective object point but, rather, its environment as well which is taken into consideration for the linking step and in that the shape and position of said environment as well as the weighting factor are determined according to the signal intensities of the environment.

14. A method according to claim 11 to 13, characterized in that the linking step is based not only on the respective object point but, rather, its environment as well and on a determination of the environment and of the weighting factor in terms of shape and relative position of the ultrasonic lobe utilized in the scanning step.

15. A method according to claim 1, characterized in that the maximum of the signal intensity is sought for each object point of the partial images gained from various scanning directions.

16. A method according to claim 15, characterized in that, for that case in which a significant maximum has been found for an object point, the image point representing said object point is further processed for producing the image as a signal generated by an echo signal of a reflecting object surface; and in that other echo signals are differently processed for the production of the image as signals generated by nondirectionally scattering object areas.

17. A method according to claim 15, characterized in that, by means of a suitable, selectable and continuously adjustable relative ratio of the respective topical maximum as a threshold value, only those partial images or echo sequences are taken into consideration in the linkage whose value appertaining to the point under consideration lies above the allocated threshold value.

18. A method according to claim 17, characterized in that the threshold value is not selected relative to the topical maximum but, rather, is respectively uniformly selected for a corresponding image part or for the overall image.

19. A method according to any of the preceeding claims, characterized in that the number of partial images which have contributed to the respective image point in a linkage image is noted in a separate "isotropy image".

20. A method according to claim 19, characterized in that the topical weighting functions respectively taken into consideration in the linking of the partial images to form a linkage image are linked in another "isotropy image".

21. A method according to claim 19 or 20, characterized in that the produced "isotropy images" are employed in order to identify the "isotropy character" of the echoes from the respective partial images, or to interpret and/or to further process the linkage image.

22. A method according to claim 21, characterized in that an image which largely represents the nondirectionally scattering object parts is filtered out of the linkage image produced by the linking of the partial images by means of the "isotropy image".

23. A method according to claim 21, characterized in that an image which largely represents the directionally reflecting object parts is filtered out of the linkage image produced by the linking of the partial images by means of the "isotropy image".

24. A method according to claim 21, characterized in that an image which represents a continuously prescribable or permanently selectable ratio of nondirectionally scattering and directionally reflecting object regions is filtered out of the linkage image produced by linking of the partial images by means of the "isotropy image".

25. A method according to claim 22, 23, or 24, characterized in that the image parts filtered out are freely selected or automatically set as a function of the object to be represented.

26. A method according to claim 1, characterized in that the signals from scattering object areas are already suppressed in the measuring exposure and/or in the production of the partial images in order to exclude disruptive or falsifying image elements.

27. A method according to claim 1, characterized in that the signals from directionally reflecting object areas are already suppressed in the measuring exposure and/or in the production of the partial images in order to exclude disruptive or falsifying image elements.

28. A method according to claim 1, characterized in that a precursory image gained from echo signals of scattering object areas is produced according to a tomography (back projection) method from X-ray examination methods.

29. A method according to claim 1, characterized in that the known back projection method is applied to all cases in which a noticeable ratio of nondirectionally scattering object regions exists and/or is desired in the image.

30. A method according to claim 28 or 29, characterized in that the image gained is corrected before or after the linking step by means of a known filtered back projection.

31. A method according to claim 1, characterized in that the individual method steps are computer-controlled.

* * * * *